(12) United States Patent
Dighe et al.

(10) Patent No.: US 10,892,990 B1
(45) Date of Patent: Jan. 12, 2021

(54) SYSTEMS AND METHODS FOR TRANSMITTING DATA TO A REMOTE STORAGE DEVICE

(71) Applicant: Veritas Technologies LLC, Mountain View, CA (US)

(72) Inventors: Sumit Dighe, Pune (IN); Shailesh Marathe, Pune (IN); Hasib Shaikh, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 35 days.

(21) Appl. No.: 16/186,527

(22) Filed: Nov. 10, 2018

(51) Int. Cl.
*H04L 12/743* (2013.01)
*H04L 12/823* (2013.01)
*H04L 5/00* (2006.01)

(52) U.S. Cl.
CPC ........ *H04L 45/7453* (2013.01); *H04L 5/0055* (2013.01); *H04L 47/32* (2013.01)

(58) Field of Classification Search
CPC . G06F 11/0727; G06F 11/079; G06F 11/0793
See application file for complete search history.

(56) References Cited

U.S. PATENT DOCUMENTS

| | | | |
|---|---|---|---|
| 5,043,885 A | 8/1991 | Robinson | |
| 9,112,922 B2 | 8/2015 | Benoit et al. | |
| 9,606,937 B1 | 3/2017 | Marathe et al. | |
| 2002/0114302 A1* | 8/2002 | McDonald | H04L 1/1854 370/338 |
| 2004/0034744 A1 | 2/2004 | Karlsson et al. | |
| 2006/0067356 A1* | 3/2006 | Kim | H04L 12/2803 370/452 |
| 2013/0242862 A1* | 9/2013 | Birlik | H04L 49/9057 370/328 |

\* cited by examiner

*Primary Examiner* — Gregory B Sefcheck
*Assistant Examiner* — Debebe A Asefa
(74) *Attorney, Agent, or Firm* — FisherBroyles, LLP

(57) ABSTRACT

The disclosed computer-implemented method for transmitting data to a remote storage device may include (i) selecting, by a computing device, a bucket of a hash table for a data packet, (ii) adding a generation number to the data packet, (iii) transmitting the data packet to a remote storage device, (iv) adding the data packet to a send-list of the bucket, (v) receiving an acknowledgement packet for the data packet, (vi) determining that the acknowledgement packet corresponds to the generation number of the data packet, and (vii) removing the data packet from the send-list of the bucket. Various other methods, systems, and computer-readable media are also disclosed.

20 Claims, 9 Drawing Sheets

SYSTEMS AND METHODS FOR TRANSMITTING DATA TO A REMOTE STORAGE DEVICE

BACKGROUND

The cost and difficulty of storing digital data has decreased, leading to an increase in digital data storage. There are many different type of digital data storage. For example, primary data storage may refer to the main memory or internal memory of a computing device, directly accessible by the central processing unit (CPU) of the computing device. Remote data storage may refer to external memory or auxiliary storage. A computing device may utilize one or more network connections to access remote data storage devices. High-speed interconnect may be utilized in distribution clusters to access digital data remotely. Existing storage applications that manage remote data storage primarily focus on the sequencing and flow control of data packets, which may impact the latency of the data retrieval process. The instant disclosure, therefore, identifies and addresses a need for systems and methods for transmitting data to a remote storage device.

SUMMARY

As will be described in greater detail below, the instant disclosure describes various systems and methods for transmitting data to a remote storage device.

In one example, a method for transmitting data to a remote storage device may include (i) selecting, by a computing device, a bucket of a hash table for a data packet, (ii) adding a generation number to the data packet, (iii) transmitting the data packet to a remote storage device, (iv) adding the data packet to a send-list of the bucket, (v) receiving an acknowledgement packet for the data packet, (vi) determining that the acknowledgement packet corresponds to the generation number of the data packet, and (vii) removing the data packet from the send-list of the bucket.

In one example, the method may further include determining that the data packet is not acknowledged within a predetermined time period, updating the generation number of the data packet to a new generation number, and re-transmitting the data packet comprising the new generation number. In one example, the method may include (i) receiving the acknowledgement packet for the data packet that corresponds to the generation number, (ii) verifying that the data packet comprising the new generation number has been transmitted, and (iii) discarding the acknowledgement packet for the data packet that correspond to the generation number. The predetermined time period may be at least a round trip time of data packets multiplied by 3. In one example, the method may further include receiving, by the remote storage device, the data packet, wherein the data packet comprises a sequence number for the bucket of the hash table and comparing the sequence number with a last acknowledged sequence number (LASN), wherein the LASN is maintained by the remote storage device. The method may further include determining that the sequence number for the bucket of the hash table is less than the LASN and discarding the data packet. The method may include determining that the sequence number is greater than the LASN, determining that the sequence number exists in a sparse list of a remoter server bucket of a remote storage device hash table, and discarding the data packet. The method may include (i) determining that the sequence number is greater than the LASN, (ii) determining that the sequence number does not exist in a sparse list of a remoter server bucket of the remote storage device hash table, (iii) inserting the data packet into the sparse list, (iv) determining that the sequence number is a value that is a next consecutive position to the LASN, and (v) updating the LASN by a number of consecutive positions in the sparse list.

In one example, a system for transmitting data to a remote storage device may include a computing device comprising at least one physical processor and physical memory comprising computer-executable instructions. Executing the computer-executable instructions may cause the computing device to (i) select a bucket of a hash table for a data packet, (ii) add a generation number to the data packet, (iii) transmit the data packet to a remote storage device, (iv) add the data packet to a send-list of the bucket, (v) receive an acknowledgement packet for the data packet, (vi) determine that the acknowledgement packet corresponds to the generation number of the data packet, and (vii) remove the data packet from the send-list of the bucket.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) select a bucket of a hash table for a data packet, (ii) add a generation number to the data packet, (iii) transmit the data packet to a remote storage device, (iv) add the data packet to a send-list of the bucket, (v) receive an acknowledgement packet for the data packet, (vi) determine that the acknowledgement packet corresponds to the generation number of the data packet, and (vii) remove the data packet from the send-list of the bucket.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
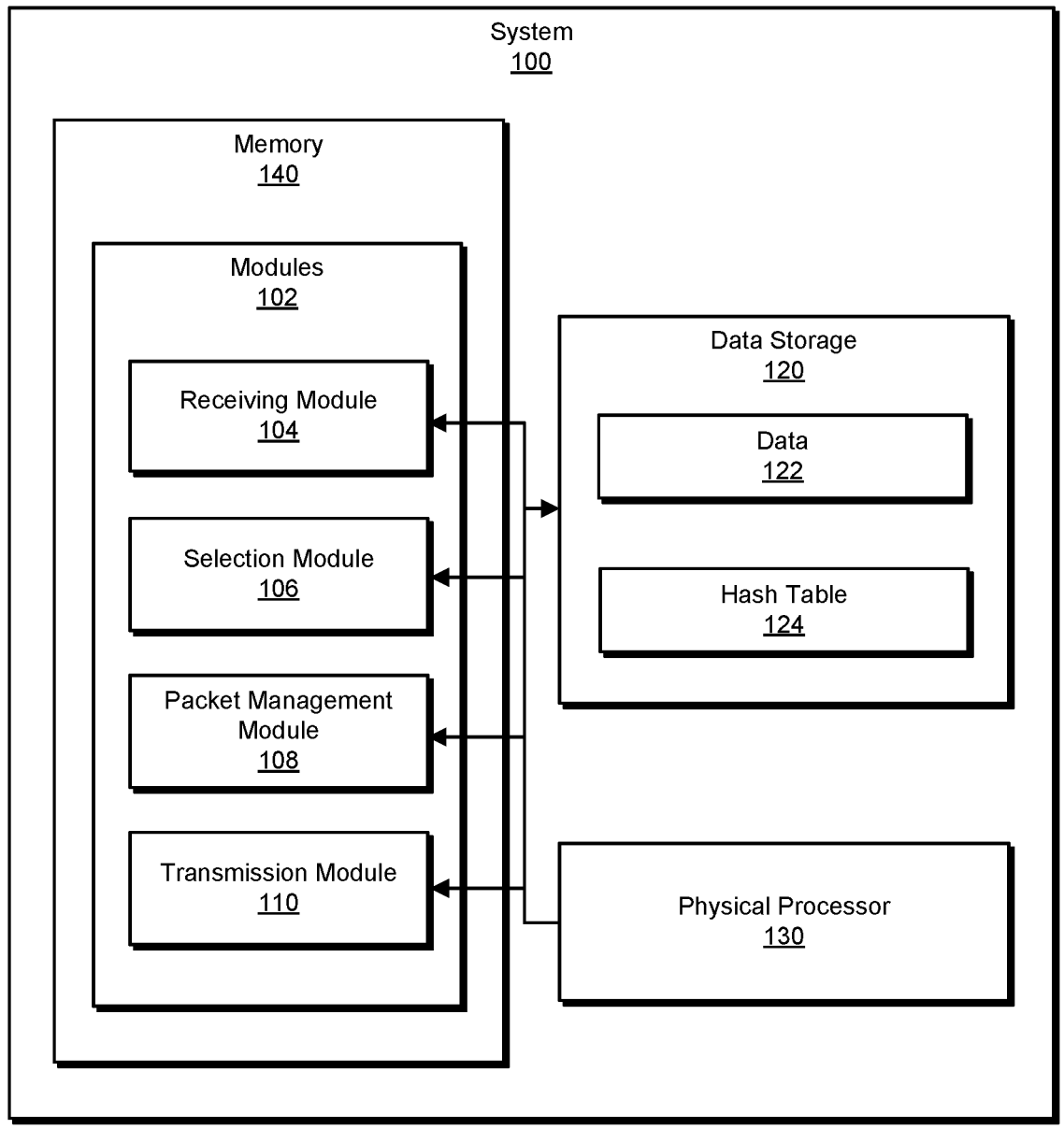
FIG. 1 is a block diagram of an example system for transmitting data to a remote storage device.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for transmitting data to a remote storage device. The systems and methods described herein are directed to provide guaranteed delivery of data in a performant manner over unreliable transport protocol, improving performance (e.g., improved latency) while accessing storage devices remotely.

Delivering data packets in sequence may require complex data transmission systems. In some examples, storage software, such as file-systems or clustered applications, may ensure the ordering of data, which alleviates the network layer from the responsibility of delivering data packets in order. The systems and methods described herein are directed to enabling the network layer to guarantee delivery of data without sequencing, which enables the computing device to deliver the request to the client as soon as it is received.

Additionally, the network layer may implement a flow-control mechanism to ensure data packets are not dropped due to being overloaded with request. The systems and methods herein are directed to applications executing on a storage sub-system that has some concurrency (parallelism) and would not infinitely keep sending data to another layer. Thus, the application would wait for parallel data to finish before sending dependent data.

Figure 2:
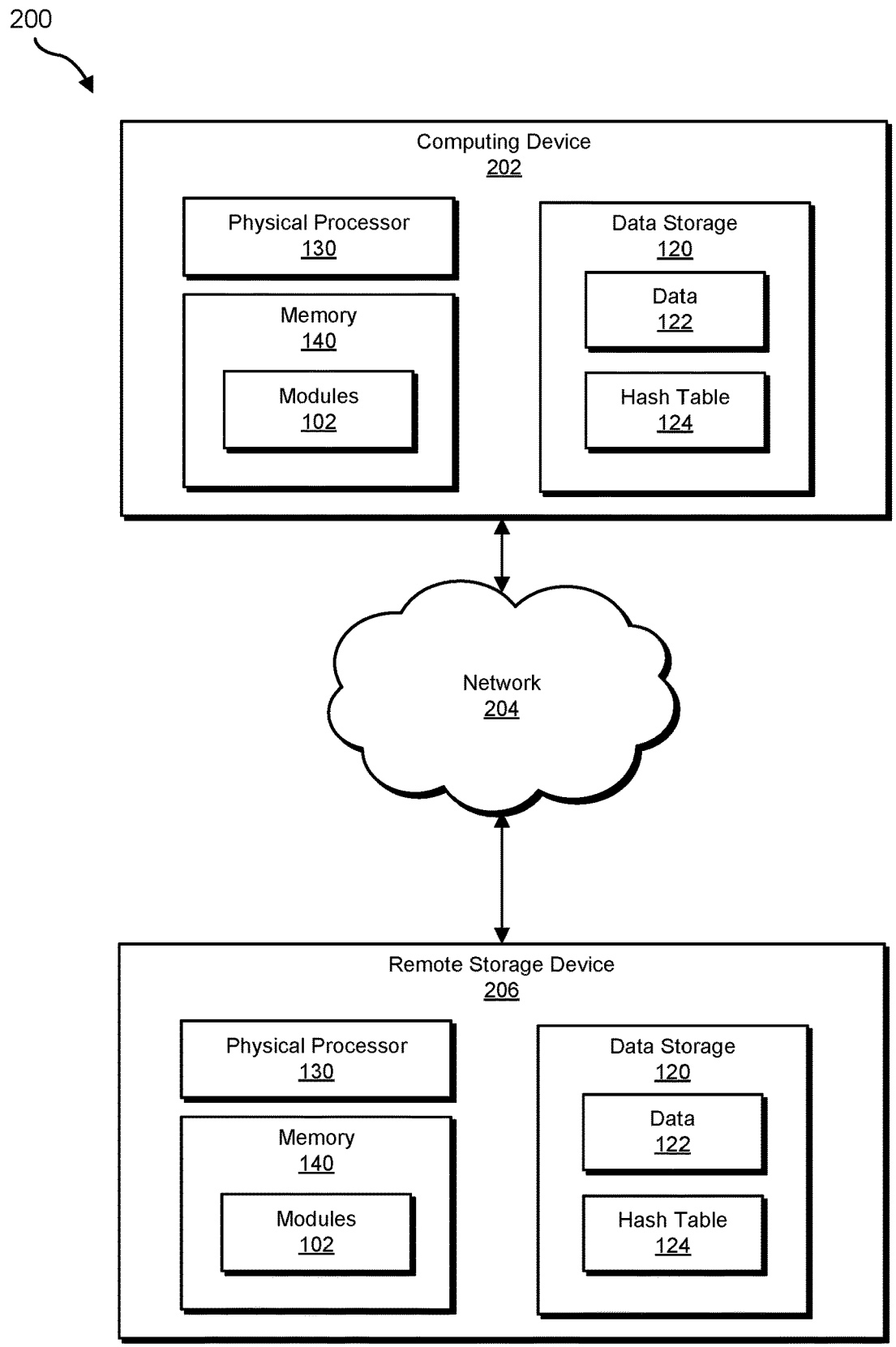
FIG. 2 is a block diagram of an additional example system for transmitting data to a remote storage device.
Figure 4:
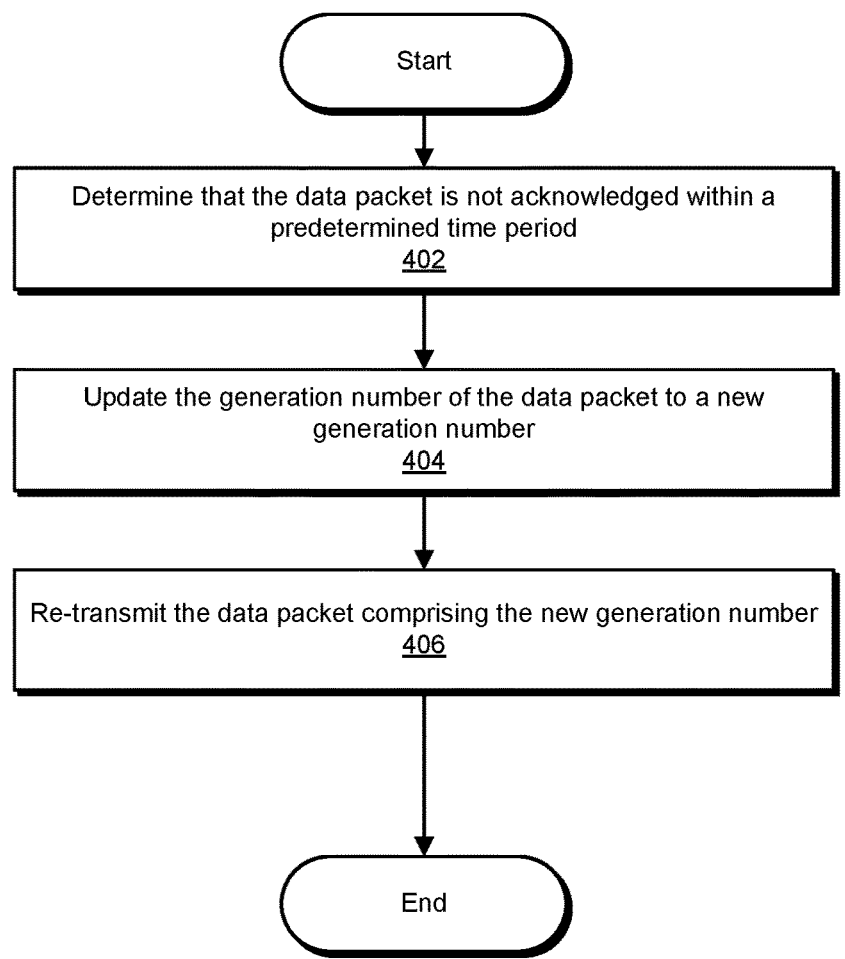
FIG. 4 is a flow diagram of another example method for transmitting data to a remote storage device.
Figure 5:
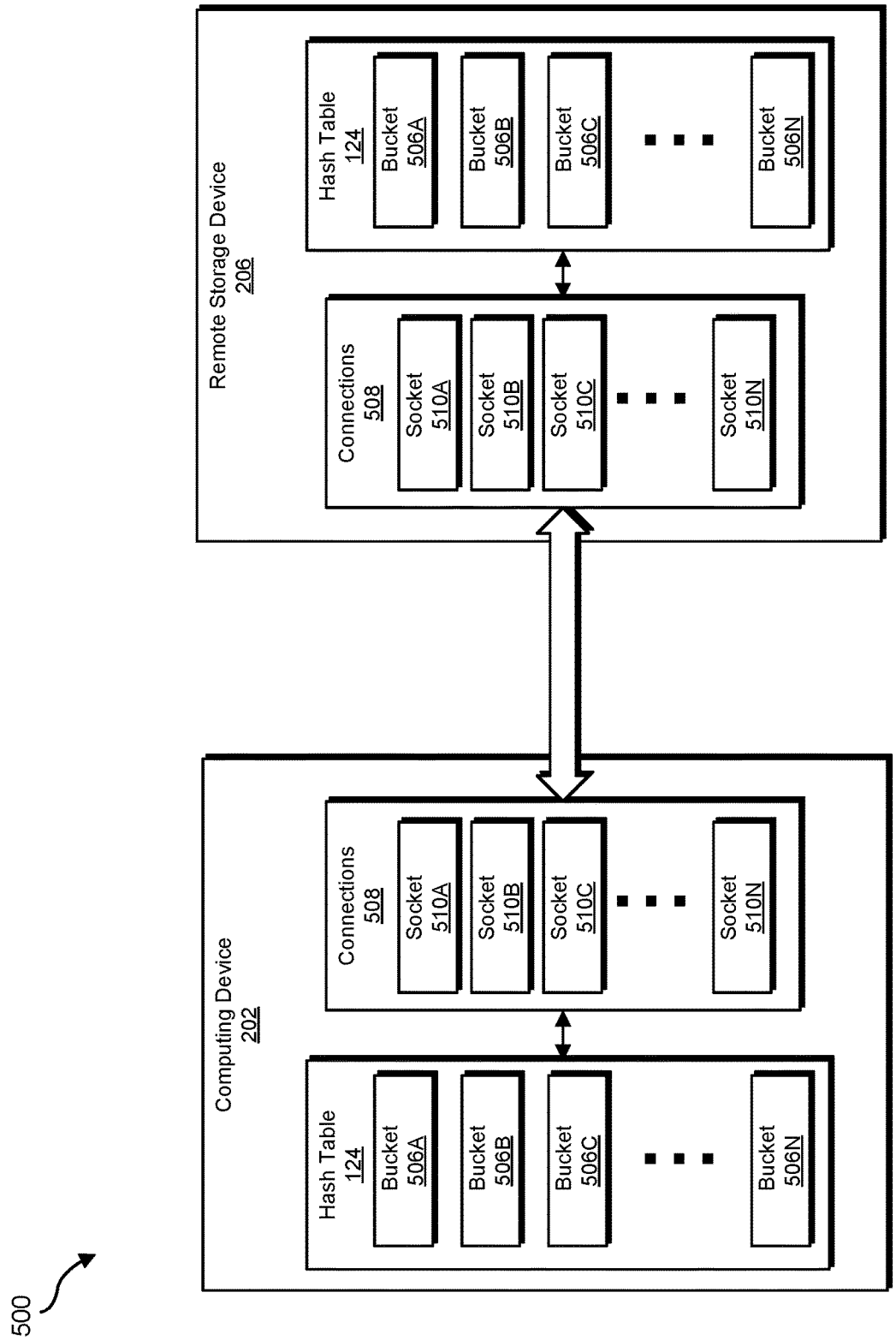
FIG. 5 is a block diagram of an additional example system for transmitting data to a remote storage device.

The following will provide, with reference to FIGS. 1-2 and 5, detailed descriptions of example systems for transmitting data to a remote storage device. Detailed descriptions of corresponding computer-implemented methods will also be provided in connection with FIGS. 3-4. A detailed description of the process for resending packets and duplication detection in systems for transmitting data to a remote storage device, will also be provided in connection with FIGS. 6-7. In addition, detailed descriptions of an example computing system and network architecture capable of implementing one or more of the embodiments described herein will be provided in connection with FIGS. 8-9, respectively.

FIG. 1 is a block diagram of an example system 100 for transmitting data to a remote storage device. As illustrated in this figure, example system 100 may include one or more modules 102 for performing one or more tasks. As will be explained in greater detail below, modules 102 may include a receiving module 104, a selection module 106, a packet management module 108, and a transmission module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or remote storage device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate transmitting data to a remote storage device. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include data storage 120. Data storage 120 generally represents any type or form of computing device capable of data storage. In one example, data storage 120 may store data 122 and one or more hash tables 124.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a remote storage device 206 via a network 204. In one example, all or a portion of the functionality of modules 102 may be performed by computing device 202, remote storage device 206, and/or any other suitable computing system. As will be described in greater detail below, one or more of modules 102 from FIG. 1 may, when executed by at least one processor of computing device 202 and/or remote storage device 206, enable computing device 202 and/or remote storage device 206 for transmitting data to a remote storage device 206.

Computing device 202 generally represents any type or form of computing device capable of reading computer-executable instructions. For example, computing device 202 may include an endpoint device (e.g., a mobile computing device) running data storage software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Remote storage device 206 generally represents any type or form of computing device that is capable of reading computer-executable instructions and data storage. In one example, remote storage device 206 may include an endpoint (e.g., a server) running data storage software. Additional examples of remote storage device 206 include, without limitation, security servers, application servers, web servers, storage servers, and/or database servers configured to run certain software applications and/or provide various security, web, storage, and/or database services. Although illustrated as a single entity in FIG. 2, remote storage device 206 may include and/or represent a plurality of servers that work and/or operate in conjunction with one another.

Network 204 generally represents any medium or architecture capable of facilitating communication or data transfer. In one example, network 204 may facilitate communication between computing device 202 and remote storage device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
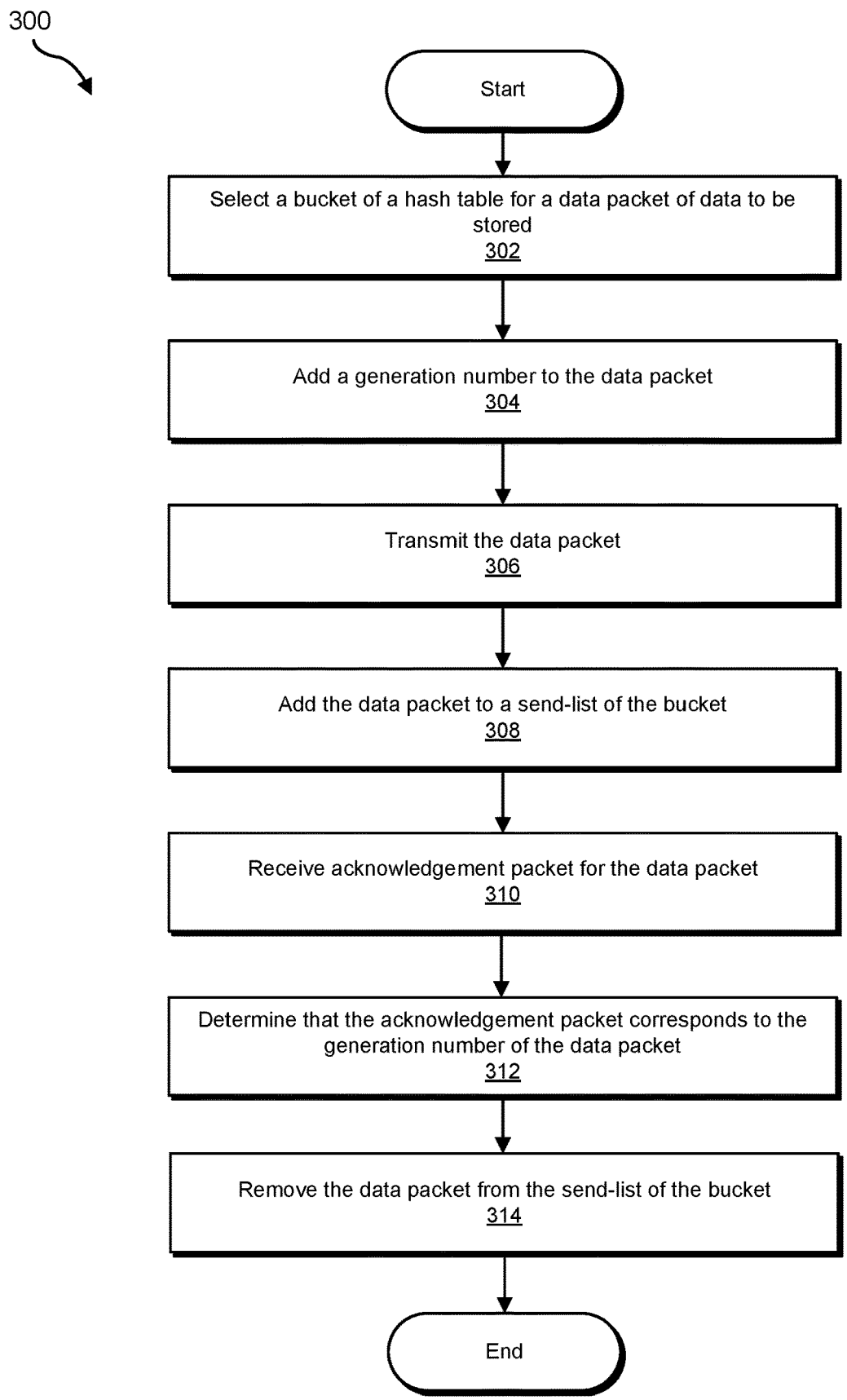
FIG. 3 is a flow diagram of an example method for transmitting data to a remote storage device.

FIG. 3 is a flow diagram of an example computer-implemented method 300 for transmitting data to a remote storage device. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may select a bucket of a hash table 124 for a data packet for data 122 to be stored. The systems described herein may perform step 302 in any suitable manner. For example, receiving module 104 may, as part of computing device 202 in FIG. 2, receive data 122 to be stored on a remote storage device 206. The data 122 may be received from an external device, a user, or the like. IN some examples, the data 122 may be generated by an application executing on the computing device 202. Selection module 106 may select a random bucket of the hash table 124. The selection module 106 may use any known algorithm or method to randomly select a bucket of the hash table 124 to assign a portion of the data 122 to be transferred to a remote storage device 206.

The term "data packet," as used herein, generally refers a network packet or other formatted unit of data that may include control information, which provides data for delivering the payload, and the payload, which is the data that is carried on behalf of an application. Data packets may be tracked by the packet management module 108 in a list associated with the bucket of the hash table 124. Data packets may include a sequence number, which is unique in the bucket of the hash table to which it is assigned. The sequence number may indicate the order of a set of data packets.

At step 304, one or more of the systems described herein may add a generation number to the data packet. The systems described herein may perform step 304 in any suitable manner. For example, packet management module 108 may, as part of system 200 in FIG. 2, generate and maintain a current generation number for the bucket of the hash table 124. The packet management module 108 may insert a generation number into the data packet that has a value the same as the current generation number maintained by the packet management module 108. The current generation module may be used by the systems and methods described herein in determinations to retransmit data packets to the remote storage device 206.

The term "generation number," as used herein, generally refers to an interval or time period that is identified by a numeric value. In some examples, a generation number may be an average routing trip time between two computing devices or nodes. The generation number may be incremented at every round trip time. The systems and methods described herein may utilize a "current generation number" and a "minimum valid generation number" as will be described in further detail below.

The term "round trip time," as used herein, generally refers to a time taken for successful delivery of a request (e.g., data packet) to a destination node (e.g., remote storage device 206). The successful delivery may include receipts of network level acknowledgement of the request.

At step 306, one or more of the systems described herein may transmit the data packet. The systems described herein may perform step 306 in any suitable manner. For example, the transmission module 110, may select a connection of the computing device 202 and transmit the data packet to the remote storage device 206. In some examples, the transmission module 110 may select the connection based on availability, capacity, or the like.

At step 308, one or more of the systems described herein may add the data packet to a send-list of the bucket. The systems described herein may perform step 308 in any suitable manner. For example, the packet management module may add the data packet to a send-list associated with its assigned bucket of the hash table 124. The send-list may be an ordered list maintained by the packet management module 108 to track data packets that have been transmitted to the remote storage device 206 and for which an acknowledgement packet has been received. In some examples, the ordering of the ordered list may be based on the generation number maintained by the packet management module 108.

At step 310, one or more of the systems described herein may receive an acknowledgement packet for the data packet. The systems described herein may perform step 310 in any suitable manner. For example, the transmission module 110 may receive the acknowledgement packet from the remote storage device 206 and transmit the acknowledgement packet to the packet management module 108.

At step 312, one or more of the systems described herein may determine that the acknowledgement packet corresponds to the generation number of the data packet. The systems described herein may perform step 312 in any suitable manner. The packet management module 108 may compare generation number of the acknowledgement packet, which it obtained from the data packet to the information for the data packet in the send-list.

At step 314, one or more of the systems described herein may remove the data packet from the send-list of the bucket. The systems described herein may perform step 314 in any suitable manner. For example, if the packet management module 108 determines the generation number of the acknowledgement packet corresponds to the generation number of the data packet, the packet management module 108 may remove the data packet from the send-list.

FIG. 4 is a flow diagram of another example computer-implemented method 400 for transmitting data to a remote storage device. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may determine that the data packet is not acknowledged within a predetermined time period. The systems described herein may perform step 402 in any suitable manner. For example, packet management module 108 may, as part of computing device 202 in FIG. 2, compute an amount of time that has elapsed since the transmission of the data packet and compare the amount of time to the predetermined time period. In some examples, the predetermined time period may be 3*the round trip time of a data packet in the system.

At step 404, one or more of the systems described herein may update the generation number of the data packet to a new generation number. The systems described herein may perform step 404 in any suitable manner. For example, the packet management module 108 may maintain a current generation number, which is updated periodically updated. In some examples, the current generation number may be updated every predetermined time period. In some examples, the current generation number may be updated based on the number of data packet transmissions. The packet management module 108 may update the generation of the data packet to the current generation number.

At step 406, the one or more systems described herein may re-transmit the data packet comprising the new generation number. The systems described herein may perform step 406 in any suitable manner. For example, transmission module 110 may retransmit the data packet comprising the new generation number to the remote storage device 206. The packet management module 108 may add the data packet with the new generation number to the send-list of the bucket of the hash table 124 to which the data packet is assigned. The packet management module 108 may wait for an acknowledgement packet corresponding to the retransmitted data packet. In some examples, the method 400 may be repeated until the data packet is acknowledged within the predetermined time period.

In some examples, the packet management module 108 may receive the acknowledgement packet for the data packet that corresponds to the current generation number. The packet management module 108 may verify that the data packet comprising the new generation number has been transmitted and may discard the acknowledgement packet for the data packet that correspond to the generation number that is now invalid or outdated.

FIG. 5 is a block diagram of an additional example system 500 for transmitting data to a remote storage device 206. As described above, the data 122 from the computing device 202 may be transmitted to the remote storage device 206 for data storage. The selection module 106 may randomly select a bucket (e.g., 506A-506N, singularly referred to as 506) and the packet management module 108 may assign at least a data packet of the data 122 to the randomly selected bucket 506. The transmission module 110 may select an available connection 508 (e.g., socket 510A-510N, singularly referred to as 510), to transmit the data packet using the selected connection and add the data packet to a sparse-order list associated with the randomly selected bucket 506. The corresponding socket 510 of the selected connection 508 may receive the data packet at the remote storage device 206. The packet management module 108 of the remote storage device 206 may obtain data from the data packet that indicates a bucket 506 of the hash table 124 of the remote storage device 206 that corresponds to the bucket 506 of the hash table 124 of the computing device 202. The packet management module 108 of the remote storage device 206 may add the data packet to a sparse-order list of the bucket 506 of the hash table 124 of the remote storage device 206 and transmit an acknowledgement packet corresponding to the data packet over a connection 508 (e.g., socket 510A-510N) to the computing device 202. The computing device 202 may receive the acknowledgement packet through the connection 508 and the packet management module 108 may determine, based on the timing of the acknowledgement packet, to remove the data packet from the list of the bucket 506 of the hash table.

Figure 6:
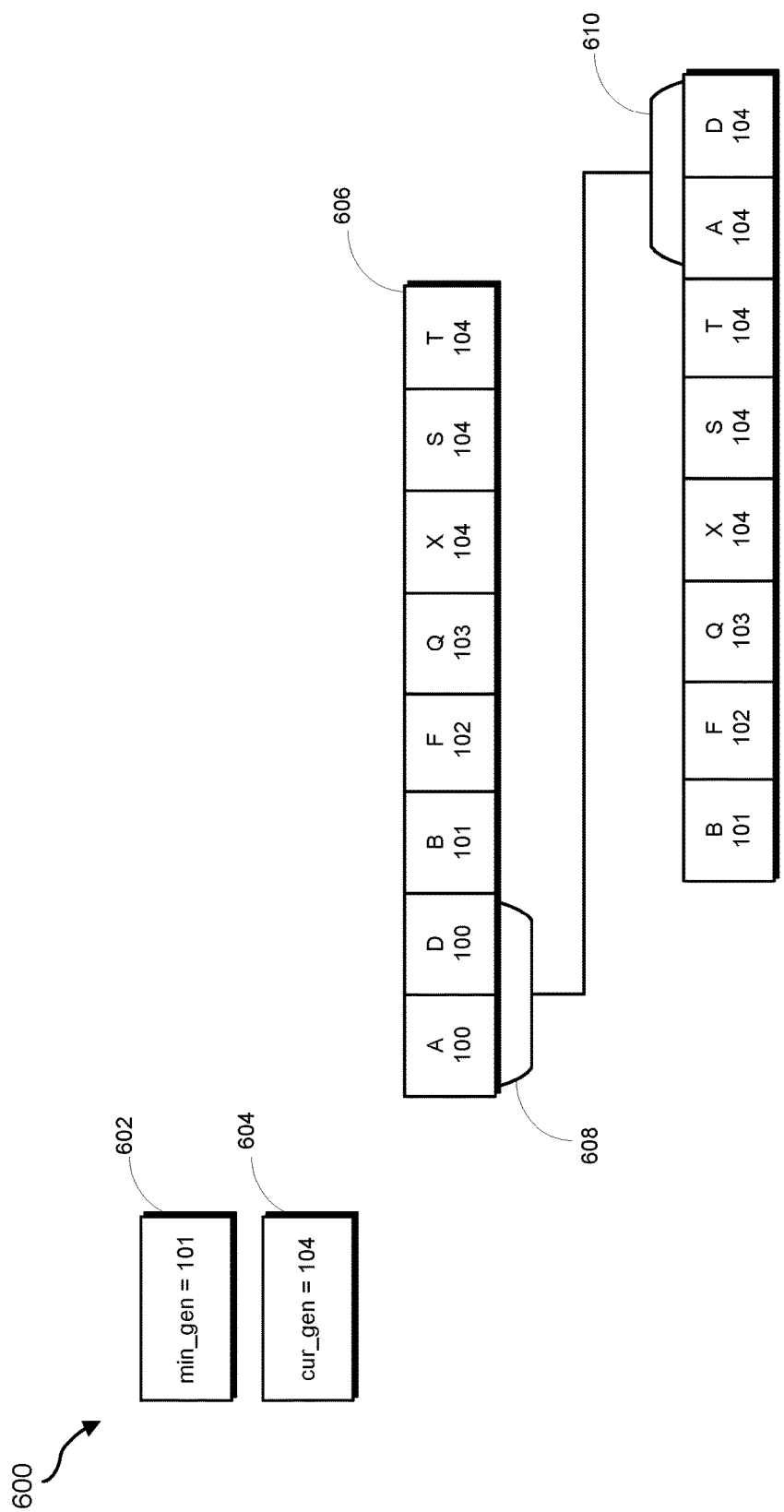
FIG. 6 is a block diagram of a resend process for transmitting data to a remote storage device.

FIG. 6 is a block diagram of a resend process 600 for transmitting data to a remote storage device. The packet management module 108 of the computing device 202 may maintain a minimum generation number 602 and a current generation number 604. The send-list 606 of the bucket of the hash table 124 includes a list of data packets that have been transmitted and are awaiting an acknowledgement from the remote storage device 206.

If the data packet transmitted by the computing device 202 has not been acknowledged by the predetermined period of time, then it will be considered for a retransmission by the transmission module 110. For example, if the data packet transmitted by the transmission module 110 has not been acknowledged within a predetermined time period (e.g., 3*round trip time), the generation number of the transmitted packet will become 1 less than the minimum generation number 602. The minimum generation number 602 is a number maintained by the packet management module 108 and used to determine when to resend or retransmit data packets. In some examples, the minimum generation number 602 may be an offset of the current generation number 604 (e.g., one or more time interval between the two values). Thus, the each of the set of data packets 608 has a generation number (e.g., value of 100) which is less than the current minimum generation number 604.

The packet management module 108 may update the generation number of each of the set of data packets 608 eligible for retransmission using the current generation number 604 (e.g., value of 104) and will resend the updated set of data packets 608 and add the updated data packets 610 to the end of the send-list 606 of the bucket of the hash table 124.

In the meantime, if an acknowledgement for the previously sent set of data packets 608 with the older (invalid) generation number (e.g., value of 100) is received after the retransmission of the updated set of data packets 608, the acknowledgement will be discarded as the data packet has already been retransmitted.

The window size of the send-list 606 of the bucket of the hash table 124 may be determined and adjusted based on how many requests have been successfully delivered to a target node (e.g., remote storage device 206). The packet management module 108 may maintain how many data packets were sent and how many were successfully acknowledged in a given interval of time. This information along-with historical samples of previous data transmissions may determine the current limit and based on that window size is adjusted.

For example, when a data packet is transmitted, a send-count (per-CPU) may be incremented by 1. When an acknowledgement for the transmitted data packet is received, an ACK-count (per CPU) may be incremented by 1. When the window size calculation time interval has expired, the total send-counts and ACK-counts from all the CPUs of the computing device 202 may be summed. If the total sent-count is higher than the total ACK-count for the interval of time, it signifies the loss of packets or too many packets sent which could not be processed in the interval of time. As a result, the window size may be adjusted to a lower number. In some examples, to avoid smaller fluctuations, the difference of sent and acknowledged packets may be guarded by a threshold value (e.g., 2%).

If there is not difference between the total send-count and total ACK-count or the different is within the threshold percentage, the window size may be increased. In some examples, the use of historic information from previous intervals of time (e.g., three to five previous intervals) may be used to determine how fast/slow the window should be increased or decreased. Further examples and details for determining window size may be found in U.S. Pat. No. 9,606,937 entitled "Cache Insertion based on Threshold Access Frequency," granted on Mar. 28, 2017, the entirety of which is incorporated herein by reference, in its entirety.

Figure 7:
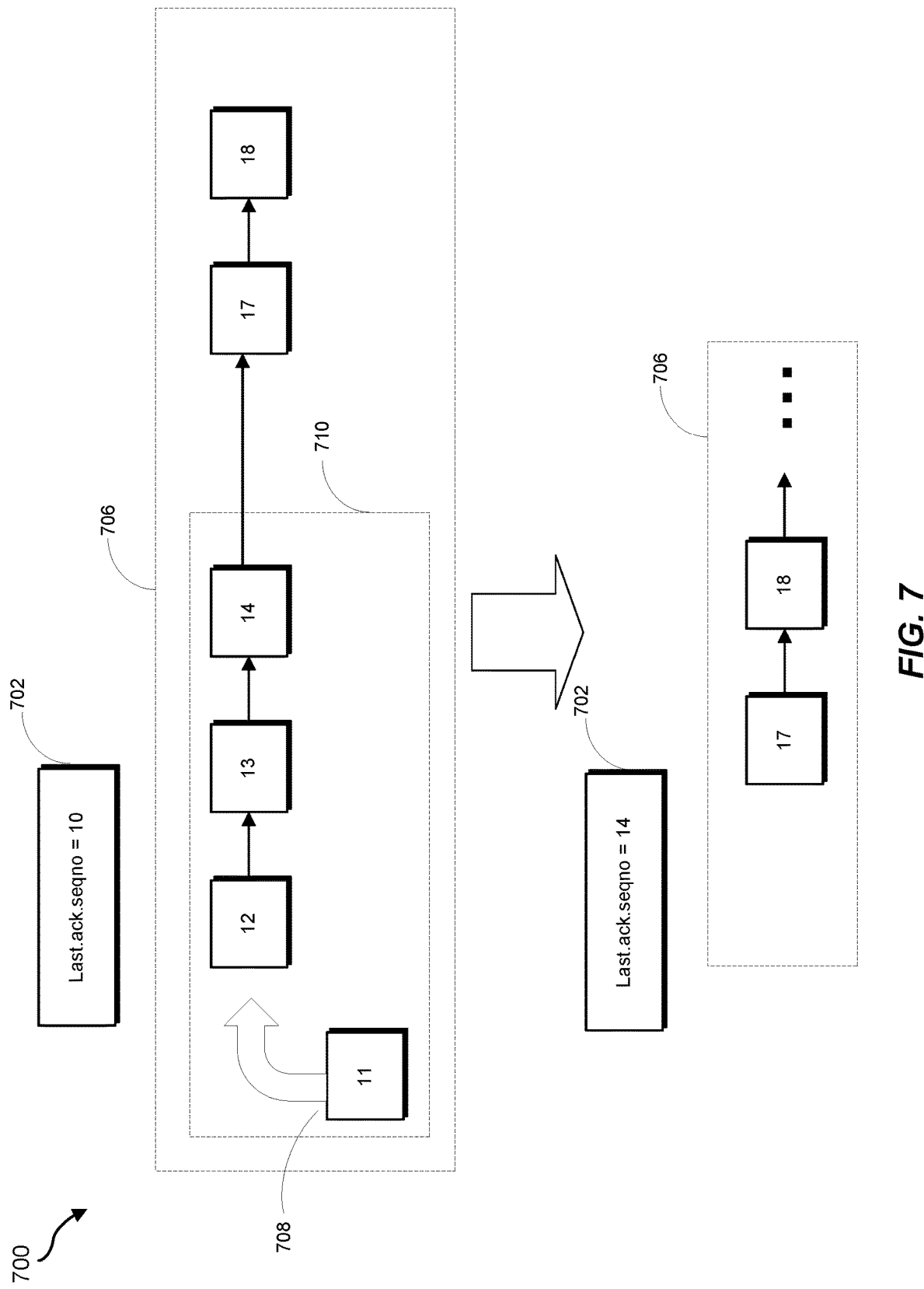
FIG. 7 is a block diagram of duplicate detection for transmitting data to a remote storage device.

FIG. 7 is a block diagram of duplicate detection 700 for transmitting data to a remote storage device. In some examples, the data packets and acknowledgement packets may be transmitted over unreliable transport protocols, such as UDP. As such, some packets may be lost in transmit or get delivered out-of-order. As discussed in FIG. 6, the computing device 202 may resend data packets if acknowledgements are not received within a predetermined time period. In one example, the remote storage device 206 may have already received the data packet and delivered to data packet to upper layers of the system for data storage, but the acknowledgment packet may have been lost in-transit to the computing device 202. Accordingly, the computing device may resend the data despite successful receipt of the data at the remote storage device 206. In some examples, the remote storage device may receive the resent data 122 and may overwrite the previously stored original data packet, which may result in data corruption.

To avoid delivering duplicate data packets received by the remote storage device 206 to layers above the network layer, the data storage device may maintain a last acknowledged in-sequence number (last_ack_seqno) 702 and an ordered-sparse list 706 of data packets received from the computing device 202.

In one example, a new data packet 708 may be received. The packet management module 108 of the remote storage device 206 may determine whether the new data packet is a duplicate. The packet management module 108 of the remote storage device 206 may compare the sequence number of the new data packet 708 (e.g., value of 11) to the last_ack_seqno 702 (e.g., vale of 10). If the sequence number of the new data packet 708 is less than the last_ack_seqno 702, then the packet management module 108 determines that the data packet has already been received and discards the new data packet 708.

If the sequence number of the new data packet 708 is equal to or greater than the last_ack_seqno 702, the packet management module 108 may search the ordered-sparse list 706 to determine if the sequence number of the new data packet 708 is present in the ordered-sparse list 706. If the sequence number of the new data packet 708 does not exist in the ordered-sparse list 706, then the new data packet 708 may be inserted into the ordered-sparse list 706. If the packet management module 108 determines that the sequence number of the new data packet 708 does exist in the ordered-sparse list, the new data packet 708 may be discarded as a duplicate. The packet management module 108 may transmit an acknowledgement for the new data packet 708 prior to discarding it to prevent resending of the new data packet 708.

If the sequence number of the new data packet 708 is the immediate value after the last_ack_seqno 702, the value of the last_ack_seqno 702 may be advanced by as many consecutive positions in the ordered-sparse list. For example, as depicted in FIG. 7, last_ack_seqno 702 has a value of 10. The new data packet 708 has a sequence number of 11, which is the immediate value after the last_ack_seqno 702, which is 10. Thus, the last_ack_seqno 702 may be advanced to last value of the ordered sequence 710, which is 14. The ordered sequence 710 of data packets may be transmitted to the upper levels of the remote storage device 206 for data storage and the ordered sequence 710 may be removed from the ordered-sparse list 706.

In some examples, sequence number and/and generation number overflow may be encountered. The systems and methods described herein may handle such overflows using appropriate checks. For example, if a current sequence number overflows, assuming it is stored in a 64-bit value, then 2^64+1 may become 0 again. In such cases, checking that the difference between the old value and the new value is greater than (2^64)/2 may be sufficient to handle the overflow condition.

The systems and methods described herein may also detect stale or ghost data transmissions. For example, in a tightly coupled clustering of computing 202 and/or remote storage devices 206, if a device is brought out of a cluster due to some errors, data packets sent on an unreliable transport may linger on the network 204. When the device is added back to the cluster and the lingering packets are delivered, they would cause data corruption as the old data is no longer meaningful, but the old data may overwrite valid data on-disk. Such stale/ghost packets need to be detected appropriately and dropped by the network layer of the remote storage device 206.

In some examples, as cluster connections are formed, a virtual link between devices may be given a unique number (e.g., cluster generation number), in increasing order. Each data packet transmitted to the cluster may include a cluster-generation number. When the remote storage device 206 receives a data packet, it may check if the cluster-generation number of the packet matches the current cluster-generation number. If the data packet received has an older cluster-generation number, it may be classified as a stale packet and may be discarded. In some examples, a cluster-membership manager layer software may provide the cluster-generation number.

The system and methods described herein may effectively use network bandwidth of multiple network interface controllers (NICs). In some examples, the number of connections or sockets created on an NIC may be based on the speed of the NIC. For example, for a 10 Gb NIC, 4 sockets may be created and for a 40 Gb NIC card, based on the number of sockets of the 10 Gb NIC card, 16 connections may be created (40 Gb/10 Gb=4; 4*4=16). Thus, by randomly distributing traffic across all the connections, effective bandwidth utilization may be achieved.

The systems and methods described herein may integrate with storage layer for delivery data packets to required alignment. For example, the storage client layer may instruct the size of specific headers such that required padding would be added while sending the data packets. This may avoid double copies of packets while delivering them at the receiver side.

The systems and methods described herein are directed to transmitting data to a remote storage device. In some examples, the system may provide improved performance over unreliable transport protocols. The storage and network layers of the system may optimize functionality in a holistic manner and optimizing sender-side resend handling and data duplication.

Figure 8:
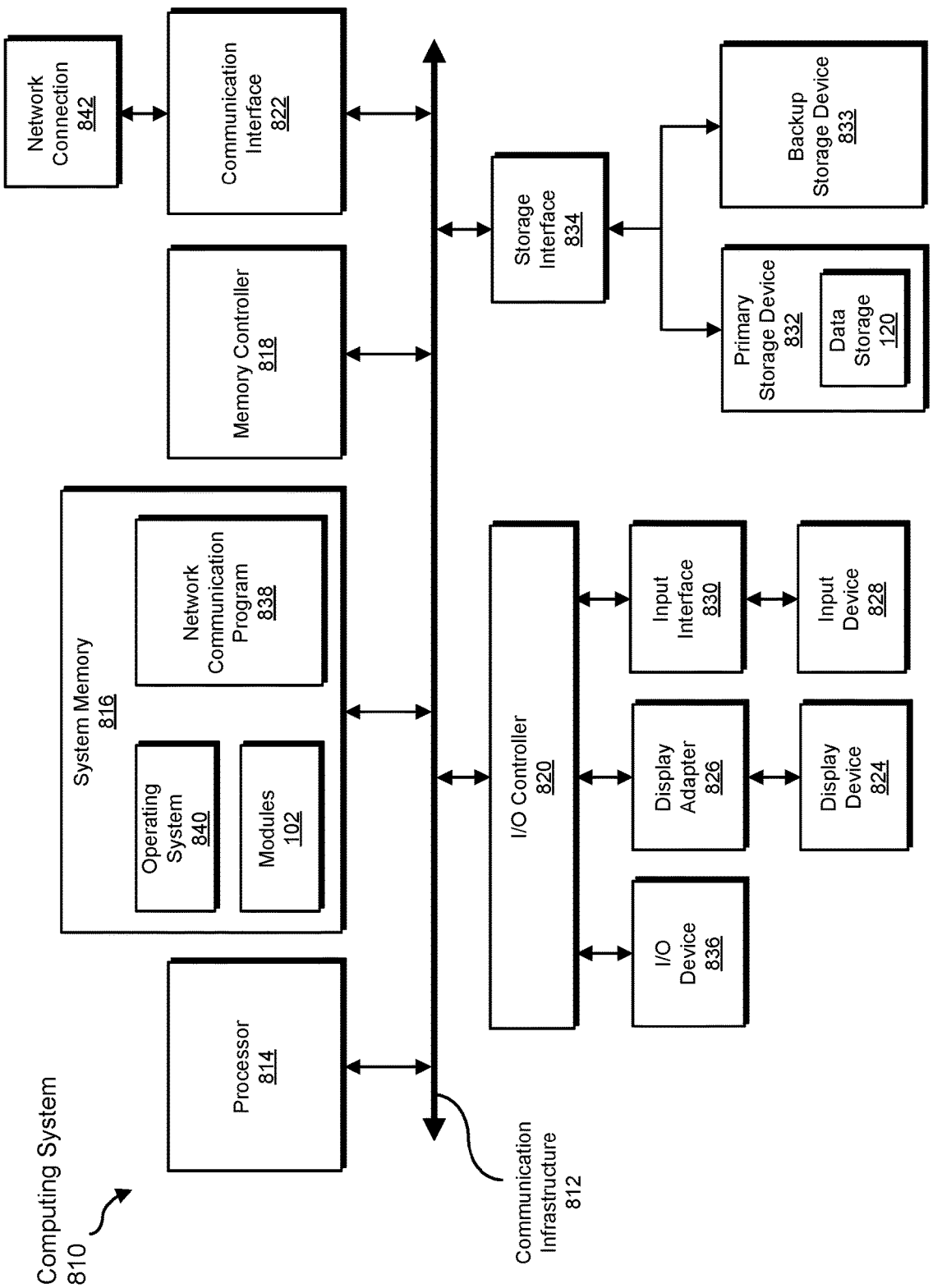
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one example, communication interface 822 may provide a direct connection to a remote storage device via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, data 122 and hash tables 124 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
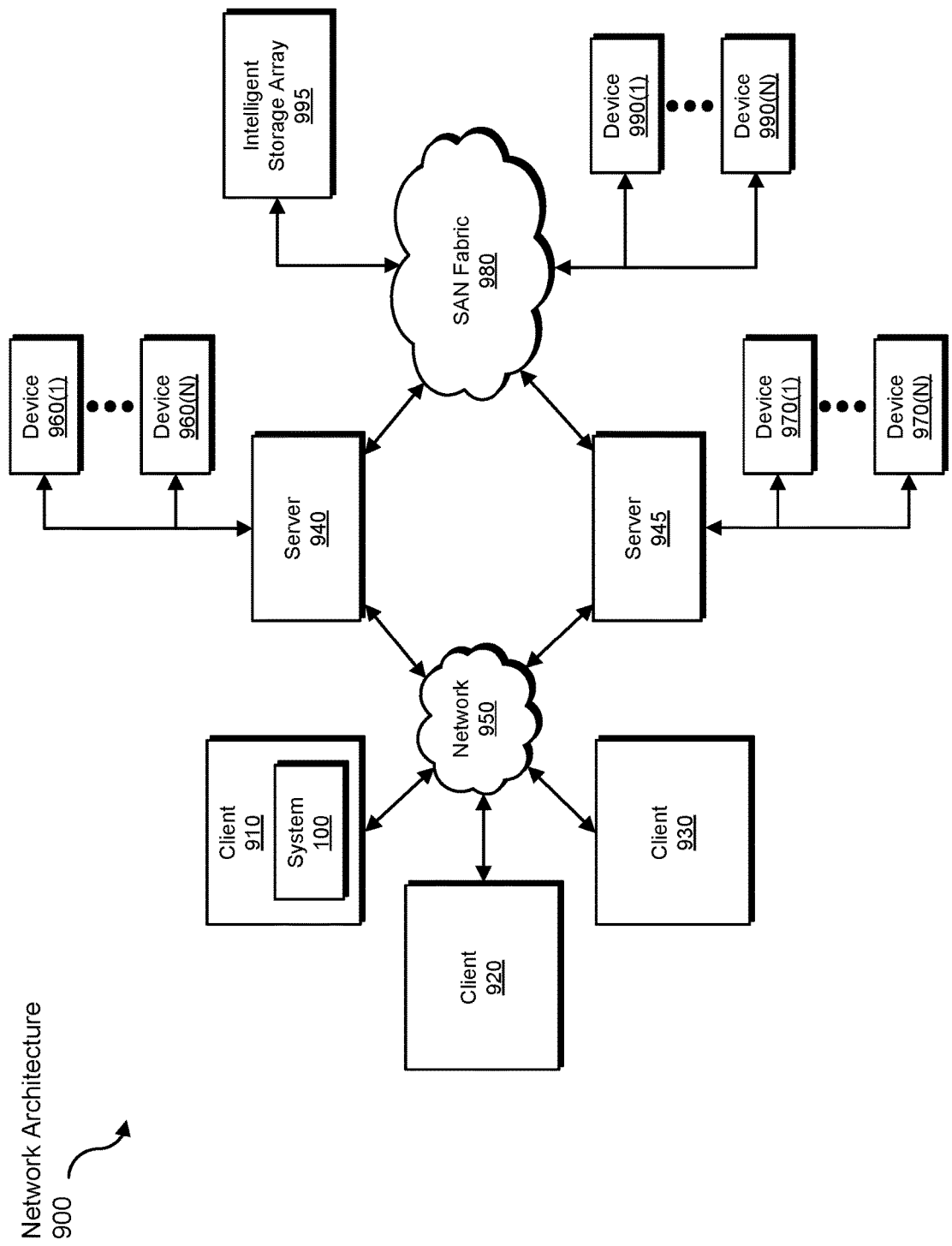
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for transmitting data to a remote storage device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for transmitting data to a remote storage device, at least a portion of the method being performed by a computing device comprising at least one processor, the method comprising:
   selecting, by a computing device, a bucket of a hash table for a data packet, wherein the data packet includes a sequence number that indicates an order of the data packet in a set of data packets and is unique in the bucket of the hash table;
   periodically incrementing, by the computing device, a current generation number maintained by the computing device to indicate an interval of time for transmission of data packets;
   adding, by the computing device, a generation number to the data packet to indicate the interval of time during which the data packet is transmitted, wherein the generation number corresponds to the current generation number and is shared by at least one other data packet in the bucket of the hash table to indicate that the other data packet is also transmitted during the interval of time;
   transmitting, by the computing device, the data packet to a remote storage device during the interval of time;
   adding, by the computing device, the data packet to a send-list of the bucket;
   receiving, by the computing device from the remote storage device, an acknowledgement packet for the data packet;
   determining that another generation number of the acknowledgement packet corresponds to the generation number of the data packet in the send-list; and
   removing the data packet from the send-list of the bucket in response to the determining.

2. The computer-implemented method of claim 1, further comprising:
   determining that the data packet is not acknowledged within a predetermined time period;
   updating the generation number of the data packet to a new generation number; and
   re-transmitting the data packet comprising the new generation number.

3. The computer-implemented method of claim 2, further comprising:
   receiving the acknowledgement packet for the data packet that corresponds to the generation number;
   verifying that the data packet comprising the new generation number has been transmitted; and
   discarding the acknowledgement packet for the data packet that correspond to the generation number.

4. The computer-implemented method of claim 2, wherein the predetermined time period is at least a round trip time of data packets multiplied by 3.

5. The computer-implemented method of claim 1, further comprising:
   receiving, by the remote storage device, the data packet, wherein the data packet comprises a sequence number for the bucket of the hash table; and
   comparing the sequence number with a last acknowledged sequence number (LASN), wherein the LASN is maintained by the remote storage device.

6. The computer-implemented method of claim 5, further comprising:
   determining that the sequence number for the bucket of the hash table is less than the LASN; and
   discarding the data packet.

7. The computer-implemented method of claim 5, further comprising:
   determining that the sequence number is greater than the LASN;
   determining that the sequence number exists in a sparse list of a remoter server bucket of a remote storage device hash table; and
   discarding the data packet.

8. The computer-implemented method of claim 5, further comprising:
   determining that the sequence number is greater than the LASN;
   determining that the sequence number does not exist in a sparse list of a remoter server bucket of a remote storage device hash table;
   inserting the data packet into the sparse list;
   determining that the sequence number is a value that is a next consecutive position to the LASN; and
   updating the LASN by a number of consecutive positions in the sparse list.

9. A system for transmitting data to a remote storage device, the system comprising:
   a computing device comprising at least one physical processor; and
   physical memory comprising computer-executable instructions that, when executed by the at least one physical processor, cause the computing device to:
      select a bucket of a hash table for a data packet, wherein the data packet includes a sequence number that indicates an order of the data packet in a set of data packets and is unique in the bucket of the hash table;
      periodically increment, by the computing device, a current generation number maintained by the computing device to indicate an interval of time for transmission of data packets;
      add a generation number to the data packet to indicate the interval of time during which the data packet is transmitted, wherein the generation number corresponds to the current generation number and is shared by at least one other data packet in the bucket of the hash table to indicate that the other data packet is also transmitted during the interval of time;
      transmit the data packet to a remote storage device during the interval of time;
      add the data packet to a send-list of the bucket;
      receive, from the remote storage device, an acknowledgement packet for the data packet;
      make a determination that another generation number of the acknowledgement packet corresponds to the generation number of the data packet; and
      remove the data packet from the send-list of the bucket in response to the determination.

10. The system of claim 9, wherein the computer-executable instructions further cause the computing device to:
   determine that the data packet is not acknowledged within a predetermined time period;
   update the generation number of the data packet to a new generation number; and
   re-transmit the data packet comprising the new generation number.

11. The system of claim 10, wherein the computer-executable instructions further cause the computing device to:
   receive the acknowledgement packet for the data packet that corresponds to the generation number;
   verify that the data packet comprising the new generation number has been transmitted; and discard the acknowledgement packet for the data packet that correspond to the generation number.

12. The system of claim 10, wherein the predetermined time period is at least a round trip time of data packets multiplied by 3.

13. The system of claim 9, wherein the computer-executable instructions further cause the computing device to:
receive, by the remote storage device, the data packet, wherein the data packet comprises a sequence number for the bucket of the hash table; and
compare the sequence number with a last acknowledged sequence number (LASN), wherein the LASN is maintained by the remote storage device.

14. The system of claim 13, wherein the computer-executable instructions further cause the computing device to:
determine that the sequence number for the bucket of the hash table is less than the LASN; and
discard the data packet.

15. The system of claim 13, wherein the computer-executable instructions further cause the computing device to:
determine that the sequence number is greater than the LASN;
determine that the sequence number exists in a sparse list of a remoter server bucket of a remote storage device hash table; and
discard the data packet.

16. The system of claim 13, wherein the computer-executable instructions further cause the computing device to:
determine that the sequence number is greater than the LASN;
determine that the sequence number does not exist in a sparse list of a remoter server bucket of a remote storage device hash table;
insert the data packet into the sparse list;
determine that the sequence number is a value that is a next consecutive position to the LASN; and
update the LASN by a number of consecutive positions in the sparse list.

17. A non-transitory computer-readable medium comprising one or more computer-executable instructions that, when executed by at least one processor of a computing device, cause the computing device to:

select a bucket of a hash table for a data packet, wherein the data packet includes a sequence number that indicates an order of the data packet in a set of data packets and is unique in the bucket of the hash table;
periodically increment a current generation number maintained by the computing device to indicate an interval of time for transmission of data packets;
add a generation number to the data packet to indicate the interval of time during which the data packet is transmitted, wherein the generation number corresponds to the current generation number and is shared by at least one other data packet in the bucket of the hash table to indicate that the other data packet is also transmitted during the interval of time;
transmit the data packet to a remote storage device during the interval of time;
add the data packet to a send-list of the bucket;
receive, from the remote storage device, an acknowledgement packet for the data packet;
make a determination that another generation number of the acknowledgement packet corresponds to the generation number of the data packet in the send-list; and
remove the data packet from the send-list of the bucket in response to the determination.

18. The non-transitory computer-readable medium of claim 17, wherein the computer-executable instructions further cause the computing device to:
determine that the data packet is not acknowledged within a predetermined time period;
update the generation number of the data packet to a new generation number; and
re-transmit the data packet comprising the new generation number.

19. The non-transitory computer-readable medium of claim 18, wherein the computer-executable instructions further cause the computing device to:
receive the acknowledgement packet for the data packet that corresponds to the generation number;
verify that the data packet comprising the new generation number has been transmitted; and
discard the acknowledgement packet for the data packet that correspond to the generation number.

20. The non-transitory computer-readable medium of claim 18, wherein the predetermined time period is at least a round trip time of data packets multiplied by 3.

* * * * *